(12) United States Patent
Roosendaal et al.

(10) Patent No.: US 8,054,421 B2
(45) Date of Patent: Nov. 8, 2011

(54) REFLECTIVE DISPLAY PANEL AND METHOD FOR MANUFACTURING SUCH A DISPLAY PANEL

(75) Inventors: Sander Jurgen Roosendaal, Brno (CZ); Martinus Hermanus Wilhelmus Maria Van Delden, Eindhoven (NL)

(73) Assignee: Adrea, LLC, Sunnyvale, CA (US)

( * ) Notice: Subject to any disclaimer, the term of this patent is extended or adjusted under 35 U.S.C. 154(b) by 265 days.

(21) Appl. No.: 12/594,203

(22) PCT Filed: Apr. 1, 2008

(86) PCT No.: PCT/IB2008/051212
§ 371 (c)(1),
(2), (4) Date: Oct. 1, 2009

(87) PCT Pub. No.: WO2008/122921
PCT Pub. Date: Oct. 16, 2008

(65) Prior Publication Data
US 2010/0118239 A1    May 13, 2010

(30) Foreign Application Priority Data
Apr. 6, 2007  (EP) .................................. 07105827

(51) Int. Cl.
G02F 1/1335 (2006.01)
G02F 1/03 (2006.01)
G02F 1/167 (2006.01)
H01J 9/20 (2006.01)
H01L 21/00 (2006.01)

(52) U.S. Cl. ........ 349/113; 349/139; 349/187; 359/263; 359/296; 445/24; 438/30

(58) Field of Classification Search .................. 349/113, 349/139, 140, 141, 142, 143, 144, 187; 445/24; 438/30; 359/263, 296
See application file for complete search history.

(56) References Cited

U.S. PATENT DOCUMENTS

| | | | | |
|---|---|---|---|---|
| 5,109,291 A | * | 4/1992 | Inaba | 349/100 |
| 5,500,750 A | | 3/1996 | Kanbe et al. | 359/58 |
| 5,811,866 A | | 9/1998 | Hirata | 257/435 |
| 6,130,733 A | | 10/2000 | Lowe | 349/86 |
| 6,177,968 B1 | * | 1/2001 | Okada et al. | 349/38 |
| 6,573,959 B1 | | 6/2003 | Molsen | 349/113 |
| 7,027,118 B1 | | 4/2006 | Wu et al. | 349/114 |

(Continued)

FOREIGN PATENT DOCUMENTS

| EP | 677768 A1 | 10/1995 |
|---|---|---|
| WO | 0140708 A2 | 6/2001 |
| WO | 2007069179 A2 | 6/2007 |

Primary Examiner — Brian Healy
(74) Attorney, Agent, or Firm — Finnegan, Henderson, Farabow, Garrett & Dunner, LLP

(57) ABSTRACT

The invention relates to a reflective display panel (9), comprising a plurality of pixels (10, 11a b), each having a modulative portion (15, 16a-b) which is controllable between light-modulation states, and a non-modulative portion (17, 18). The reflective display panel (9) comprises a redirection sheet (14) having a plurality of redirecting structures (19, 20) each being configured to redirect ambient light incident thereon towards an adjacent modulative portion (15, 16a-b). Through the invention, the portion of the light which would otherwise have hit the non-modulative portion of the pixel and would not have contributed constructively to the image forming of the display panel is instead directed towards the modulative portion of the pixel and can thereby contribute to the brightness as well as to the contrast of the reflective display panel.

20 Claims, 8 Drawing Sheets

U.S. PATENT DOCUMENTS

| | | | |
|---|---|---|---|
| 2003/0210366 A1 | 11/2003 | Huang et al. | 349/113 |
| 2005/0134769 A1* | 6/2005 | Mi | 349/114 |
| 2006/0176540 A1 | 8/2006 | Kamijima | 359/237 |
| 2010/0118239 A1* | 5/2010 | Roosendaal et al. | 349/113 |

* cited by examiner

REFLECTIVE DISPLAY PANEL AND METHOD FOR MANUFACTURING SUCH A DISPLAY PANEL

FIELD OF THE INVENTION

The present invention relates to a reflective display panel, comprising a plurality of pixels, each having a modulative portion which is controllable between light-modulation states, and a non-modulative portion.

The present invention also relates to a method for manufacturing such a reflective display panel.

BACKGROUND OF THE INVENTION

Flat panel displays of various kinds are presently the displays of choice for a variety of applications, ranging from full-size television screens to minute displays in hand-held devices. To accommodate all of these diverse applications, various types of flat panel displays have been developed and are being developed, utilizing various image-forming technologies, such as liquid crystal technology, electrowetting, electrophoresis and electrochromism.

For applications where power consumption is the main concern, reflective displays, not requiring a backlight in order to display an image, are generally used. In a reflective display, light incident on the display is reflected differently in different areas of the display and an image thereby becomes visible to the user.

Generally, each pixel in a reflective display has a modulative portion, which can be switched between reflection states in a controllable way, and a non-modulative portion, which does not constructively contribute to the modulation of the light.

For example, in the case of an active-matrix reflective liquid crystal display (LCD), each pixel may be individually addressed and activated through applying a voltage over a liquid crystal layer sandwiched between two electrode layers. In order to drive individual pixels, a pixel electrode is typically connected to drive circuitry, which is normally implemented in the same plane as the pixel electrode.

In the case of such an LCD, the non-modulative portion of each pixel includes the drive circuitry implemented in the same plane as the reflective electrode layer, pixel selection lines and so on.

Traditionally, the non-modulative portions of pixels in a reflective display have been shielded by a black mask. Light incident in the black mask portions cannot contribute to the brightness and/or contrast of the display. This leads to a loss in brightness and/or contrast of the display, which is especially serious for low ambient light conditions.

In U.S. Pat. No. 5,500,750, a liquid crystal display is disclosed in which this problem is addressed through forming a reflective light shielding layer in order to shield the drive circuitry from incoming light and reflect light incident on the light shielding layer covering the pixel drive circuitry. The light shielding layer according to U.S. Pat. No. 5,500,750 is disposed in the same plane as the reflective electrode layer and bumps are formed on the light shielding layer as well as on the reflective electrode layer in order to redirect obliquely incident light towards a direction vertical to the display.

Although the brightness of the display disclosed in U.S. Pat. No. 5,500,750 may be improved compared to the traditional black mask technology, the contrast would appear to be unaffected or even adversely affected.

SUMMARY OF THE INVENTION

In view of the above-mentioned and other drawbacks of the prior art, a general object of the present invention is to provide an improved reflective display panel.

A further object of the present invention is to enable improved brightness and/or contrast in a reflective display panel.

According to a first aspect of the present invention, these and other objects are achieved by a reflective display panel, comprising a plurality of pixels, each having a modulative portion which is controllable between light-modulation states, and a non-modulative portion, wherein the reflective display panel comprises a redirection sheet having a plurality of redirecting structures each being configured to redirect ambient light incident on a corresponding one of the non-modulative portions towards an adjacent modulative portion.

It should be noted that the reflective display panel according to the present invention is preferably thin (in contrast to conventional CRT-displays) and may be rigid or flexible depending on field of application.

The reflective display panel according to the present invention may be any kind of display in which an image is generated by modulating the reflection in the display panel of ambient light. In particular, the reflective display panel according to the invention may be a display panel in which a light-modulative member is provided between pixel control electrodes, a display panel in which pixel control electrodes are provided in essentially the same plane, or a combination thereof.

The redirection sheet may be made of any material, which is at least partly optically transmissive. In particular, the redirection sheet may be made of a rigid material, such as glass, or a flexible material, such as various kinds of plastic materials such as polyethylene (PET), polyethylene naphthalate (PEN), or polyethersulphone (PES).

The "non-modulative portion" is a portion of the pixel which cannot be used to modulate light in a constructive way, and may correspond to various structures in the pixel, such as pixel driving electronics, pixel addressing lines, pixel separating/defining structures, etc.

The contrast of the display panel may, for example, be represented by the contrast ratio (CR), which is defined according to the following:

$$CR = I_{max}/I_{min},$$

where $I_{max}$ is the intensity of the light reflected from the display panel when in a state of maximum reflectance, and $I_{min}$ is the intensity of the light reflected from the display panel when in a state of minimum reflectance.

The present invention is based on the realization that the brightness and contrast of a reflective display panel can be improved by redirecting ambient light incident on the non-modulative portion of a pixel towards an adjacent modulative portion of the pixel.

Through the invention, the portion of the light which would otherwise have hit the non-modulative portion of the pixel and would not have contributed constructively to the image forming of the display panel is instead directed towards the modulative portion of the pixel and can thereby contribute to the brightness as well as to the contrast of the reflective display panel.

By providing such light-redirection from the non-modulative portions towards the modulative portions by means of a redirection sheet, mass-production of the improved reflective display panel is facilitated, and very cost-efficient production methods, such as reel-to-reel manufacturing are enabled.

The redirecting structures in the redirection sheet may be configured such that an extension of the redirecting structures essentially corresponds to an extension of the optically inactive portions of the display panel.

In order to facilitate aligning of the redirecting structures with the optically inactive portions, the extension of each redirecting structure may, furthermore, be smaller than the corresponding optically inactive portion above which the particular redirecting structure should be positioned.

The redirection sheet may comprise a first set of redirecting structures extending essentially parallely in a plane defined by the redirection sheet.

When the non-modulative portions extend in more than one principal direction of extension, the extension of the redirecting structures may essentially correspond to the fraction of the optically inactive portions extending in one of these principal directions of extension, preferably the one corresponding to the larger fraction.

Although such a one-dimensional redirecting structure configuration would, in such cases, not be able to provide an optimal brightness and contrast enhancement, it may still be an attractive alternative due to the simplified manufacturing procedure following from only having to align the redirection sheet to the optically inactive portions of the display panel in one dimension.

The redirection sheet may further comprise a second set of essentially parallel redirecting structures having a different direction of extension than the first set of redirecting structures in the plane defined by the redirection sheet.

Through the provision of such a second set of redirecting structures, inactive pixel portions extending in more than one principal direction of extension can more efficiently be covered by redirecting structures and the light impinging on optically inactive portions thereby more efficiently be utilized for contributing to increase the brightness and contrast of the reflective display panel.

Moreover, each of the redirecting structures may be provided as an indentation on a first face of the redirection sheet, and the redirection sheet may be arranged in such a way that the ambient light is incident on an opposing second face thereof.

Hereby, very efficient methods for producing the redirection sheet, such as reel-to-reel production are enabled.

According to one embodiment, the indentation may contain a material having a lower refractive index than the redirection sheet, such that total internal reflection is enabled at a material interface defined by the indentation. This material may be any one of a solid, a liquid or a gas, or a combination thereof.

A reflector relying on total internal reflection (TIR) is very efficient, having 100% reflectance for angles of incidence larger than the critical angle.

The critical angle ($\theta_{crit}$) depends on the relation between the refractive indices of the redirection sheet ($n_{redir}$) and the adjacent material ($n_{adjacent}$) according to the following relation:

$$\theta_{crit} = \arcsin(n_{redir}/n_{adjacent})$$

For example, in the case of glass ($n_{glass} \approx 1.5$) as a redirection sheet material and air ($n_{air}=1$) as the adjacent material, the critical angle becomes about 42°.

According to another embodiment, the indentation may contain a reflecting material.

The indentation may be filled with a reflecting material, preferably a specularly reflecting material, or a reflecting layer may be formed on the surface of the indentation.

Furthermore, the indentation may have an essentially V-shaped cross-section.

Indentations with V-shaped cross-sections, or, more generally with a cross-section which is flaring in the light-modifying layer direction, are easy to manufacture through, for example, embossing (in particular thermo or photo embossing), scribing, grinding or milling, and make excellent reflectors. Furthermore, a V-shaped cross-section makes the indentations relatively tolerant to deformation by stretching of the redirection sheet, such as may occur during manufacturing of the reflective display panel according to the present invention.

Of course, however, other cross-sections are possible and may have advantageous properties for various applications. For example, the indentations may have walls which are straight or curved in a convex, concave, or undulating fashion, and the bottom of the indentations may be sharp, rounded or flat.

Preferably, an opening angle of the V-shaped cross-section may be smaller than 150°.

For practically all opening angles, the brightness of the reflective display panel is improved. The improvement in contrast is, however, largely dependent on the above opening angle. By forming the redirecting structure with a cross-section opening angle according to the above, a satisfactory contrast ratio is obtained for most illumination conditions.

Even more preferably, the opening angle of the V-shaped cross-section may be either between 0° and 80°, or between 100° and 150°.

For essentially V-shaped cross-sections, there are two opening angle ranges—between 0° and approximately 80°, and between approximately 100° and approximately 150° where the contrast modulation is practically independent of opening angle.

Moreover, the redirection sheet may further be configured to function as at least one of a polarizer, a retarder, a glare-reducing member, a surface reflection reducing member, and a scratch-protecting member.

By integrating one or several additional display panel-related functions in the redirection sheet, the manufacturing process for production of the reflective display panel according to the invention becomes more efficient, leading to a reduced production cost.

Furthermore, in applicable cases, the alignment between different functional layers may be improved, enabling improved display panel performance and/or production yield.

Additionally, the reflective display panel according to the present invention may further comprise a covering sheet arranged to cover the redirection sheet, the covering sheet having a refractive index which is substantially equal to that of the redirection sheet.

Hereby, reflections at an interface between the redirection sheet and the covering sheet are avoided, whereby the incoming light is utilized the most efficiently.

According to one embodiment of the reflective display panel of the present invention, each pixel may comprise a liquid crystal layer and a pair of electrodes arranged in such a way that a modulative portion of the liquid crystal layer is controllable between light-modulation states through application of a voltage between the electrodes.

In this embodiment of the present invention, the reflective display panel is consequently a liquid crystal display panel (LCD). This LCD panel may have the liquid crystal layer sandwiched between electrode layers or function through so-called in-plane switching, in which case the pair of electrodes are provided in the same plane. In an LCD, the non-modulative portion of each pixel typically includes a portion corresponding to pixel driving circuitry and/or pixel selection lines.

According to another embodiment of the reflective display panel of the present invention, each pixel may comprise two immiscible fluids having different optical properties, and a pair or electrodes for controllably moving the fluids in relation to each other through application of a voltage between the electrodes.

In this embodiment of the present invention, the reflective display panel is consequently an electrowetting display panel, and the non-modulative portion of each pixel typically includes a portion corresponding to separation walls, separating the fluids in one pixel from the fluids in adjacent pixels.

According to a further embodiment of the reflective display panel of the present invention, each pixel may comprise a fluid and a plurality of charged particles suspended therein, and a pair or electrodes for controllably moving the plurality of charged particles through application of a voltage between the electrodes.

In this embodiment of the present invention, the reflective display panel is consequently an electrophoretic display panel. In an electrophoretic display, the non-modulative portion of each pixel typically includes a portion corresponding to separation walls, separating the suspended particles in one pixel from the suspended particles in adjacent pixels.

According to a second aspect of the present invention, the above-mentioned and other objects are achieved by a method for manufacturing a reflective display panel, the method comprising the steps of providing a reflective display panel comprising a plurality of pixels, each having a modulative portion which is controllable between light-modulation states, and a non-modulative portion, and attaching, to the reflective display panel, a redirection sheet having a plurality of redirecting structures configured to redirect ambient light incident thereon towards intermediate portions of the redirection sheet, in such a way that each of the redirecting structures is essentially aligned with a corresponding one of the non-modulative portions.

Hereby a reflective display panel having improved brightness and contrast can be manufactured.

Further features and advantageous effects of this second aspect of the invention are largely analogous to those discussed above in connection with the first aspect of the invention.

Advantageously, furthermore, the step of attaching may comprise the steps of aligning the redirecting structures with corresponding non-modulative portions in the display panel, and fixing the redirection sheet to the display panel.

This step of aligning may comprise the steps of monitoring a reflection of the display panel, and stretching the redirection sheet such that the evaluation indicates a correct alignment.

By manufacturing the redirection sheet in a stretchable material and implementing the above steps of monitoring the reflection and stretching the redirection sheet, the tolerance requirements in the forming of the redirecting structures are reduced.

During, or following the step of fixing the, potentially stretched, redirection sheet to the display panel, the redirection sheet may be heated such that stress induced due to the stretching are released. To this end, the fixing may be carried out through, for example, heat-lamination.

Furthermore, the redirection sheet may advantageously be applied in a reel-to-reel process.

According to a third aspect of the present invention, the above-mentioned and other objects are achieved by a method for manufacturing a reflective display panel comprising a plurality of pixels, each having a modulative portion which is controllable between light-modulation states, and a non-modulative portion, the method comprising the steps of providing a cover sheet comprising a photo-imageable pixel-defining layer, and a redirection layer having a plurality of redirecting structures configured to redirect light incident thereon towards intermediate portions of the pixel-defining layer, and irradiating the cover sheet from a redirection layer side thereof by means of a light-source adapted to enable patterning of the photoimageable pixel-defining layer, thereby leaving portions of the pixel-defining layer corresponding to the redirecting structures essentially unexposed, while exposing remaining portions thereof; developing the pixel-defining layer, thereby forming a pixel-defining wall structure comprising a plurality of walled-in pixel areas, providing a light-modulative member within each of the walled-in pixel areas, and providing, on a pixel-defining layer side of the cover sheet, a display base carrier.

Through this method, which is especially advantageous for reflective display panels in which each pixel comprises a compartment containing a light-modulative member, such as, for example, the above-discussed electrowetting and electrophoretic reflective display panels, walls defining the extensions of the modulative portion of each pixel are self-aligned to the redirecting structures in the redirection sheet.

Consequently, since the non-modulative portions are formed using the redirecting structures as a mask, no process of alignment of the redirection sheet with respect to the non-modulative portions has to be made.

The photoimageable definition layer may preferably comprise a positive photoresist.

Additionally, the display base carrier may comprise an electrode pattern, and the step of providing the display base carrier may comprise the steps of aligning the display base carrier to the cover sheet in such a way that an electrode pair is provided for each of the pixels, and attaching the display base carrier to the cover sheet.

The method according to the present aspect of the invention may further comprise the step of forming, for each pixel, a conductive layer on at least a portion of the pixel-defining wall structure.

Hereby, at least a portion of the wall defining a pixel can function a pixel control electrode. Another pixel control electrode may be positioned on another portion of this wall, or may be formed on the base carrier within the walled-in pixel area. When the first electrode is formed on the base carrier within the walled-in pixel area, the redirection sheet may, for each pixel, include a redirecting structure corresponding to the location of the first electrode.

BRIEF DESCRIPTION OF THE DRAWINGS

These and other aspects of the present invention will now be described in more detail, with reference to the appended drawings showing currently preferred embodiments of the invention, wherein:

FIG. 3b is a schematic perspective view of a redirection sheet having parally extending redirection structures corresponding to the larger fraction of the non-modulative portion configuration in FIG. 3a;

FIG. 5 is a diagram schematically illustrating contrast modulation as a function of redirecting structure opening angle for the configuration in FIG. 4a;

Figure 1:
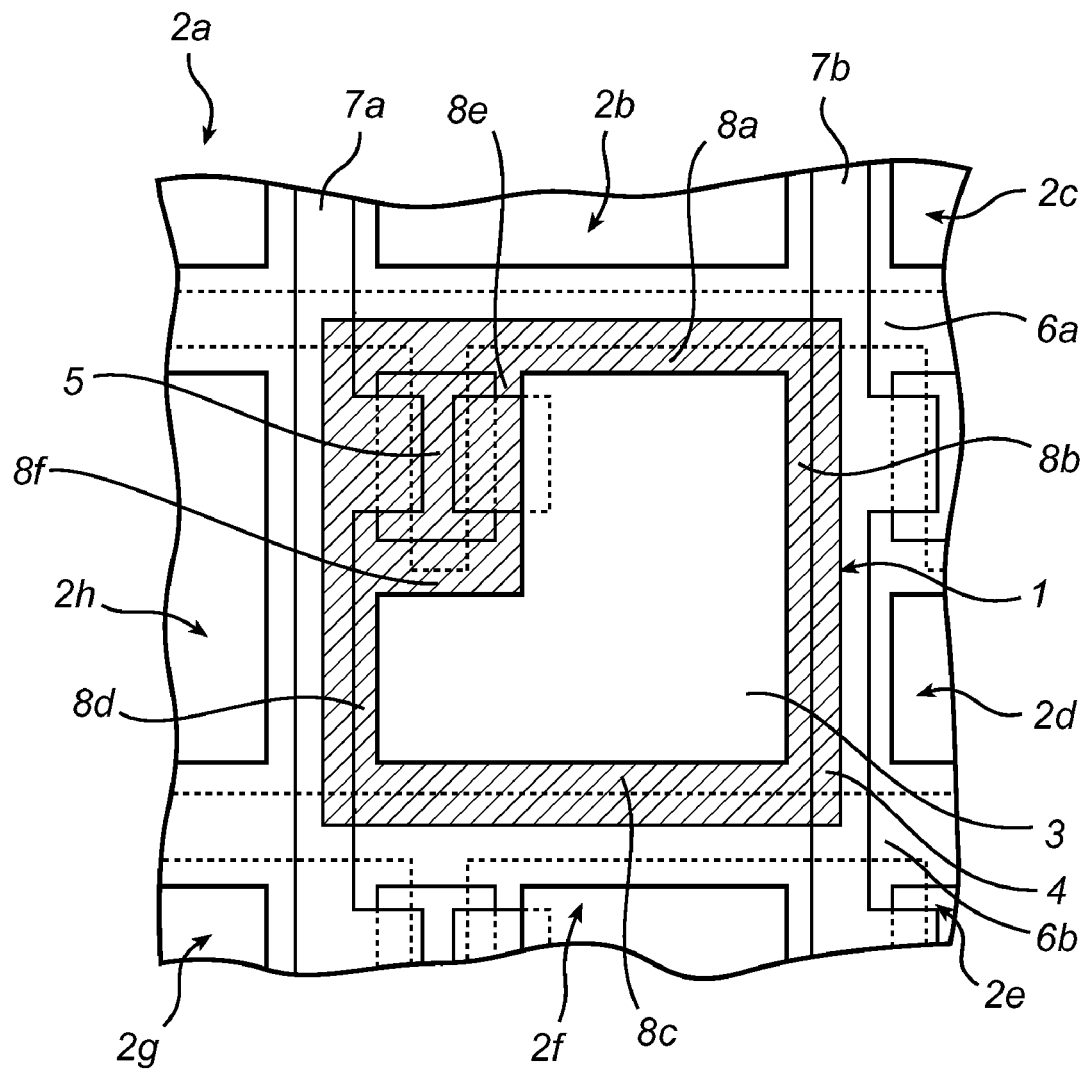
FIG. 1 is a schematic plane view of a portion of an exemplary reflective display panel.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION OF THE EMBODIMENTS

In the following description, reference is primarily made to a reflective liquid crystal panel having a liquid crystal layer sandwiched between a first transparent electrode layer and a second electrode layer. It should be noted that this by no means limits the scope of the invention, which is equally applicable to other types of reflective display panels, such as electrowetting display panels, electrophoretic display panels, and electrochromic display panels. It should, furthermore, be noted that several of these display panel types also may function through so-called in-plane switching in which case the first and second electrodes are in the same plane. This is especially the case for liquid crystal display panels and electrophoretic display panels.

FIG. 1 schematically shows a plane view of a portion of an exemplary reflective display panel. In particular, FIG. 1 shows a portion of the second layer of a reflective liquid crystal panel.

In FIG. 1, an area 1 of the second layer corresponding to a full pixel is shown surrounded by portions 2a-h of areas corresponding to adjacent pixels. The area 1 corresponding to the full pixel is occupied by a modulative portion in the form of a reflective electrode layer portion 3 and a non-modulative portion 4 (hatched in FIG. 1). In the exemplary reflective display panel segment illustrated in FIG. 1, the non-modulative portion 4 is mainly constituted by a thin film transistor (TFT) 5 used for driving the reflective electrode 3, portions of horizontal 6a-b and vertical 7a-b pixel selection lines and insulating traces 8a-e separating the reflective electrode layer portion 3 from the TFT 5 and the horizontal 6a-b and vertical 7a-b pixel selection lines. When applying a control voltage to the reflective electrode 3, a pixel area corresponding to this reflective electrode 3 is switched to allow or restrict reflection of incident light. However, a sizeable portion of the pixel, corresponding to the non-modulative portion 4, remains unaffected by the application of the control voltage.

It will, in the following description of preferred embodiments of the present invention be shown how at least a fraction of the light incident on this non-modulative portion can be redirected towards adjacent modulative portions 3 and thereby contribute to the brightness and contrast of the reflective display panel.

In the present description, for the purpose of clarity, the various embodiments of the invention are described using highly simplified illustrations of a reflective display panel in which various layers well known in the art, such as alignment layers, polarizing layers, electrode layers, TFT-formation layers etc are not specifically indicated. For a person skilled in the relevant field it should, however, be obvious how to apply these various features to the described embodiments.

Figure 2:
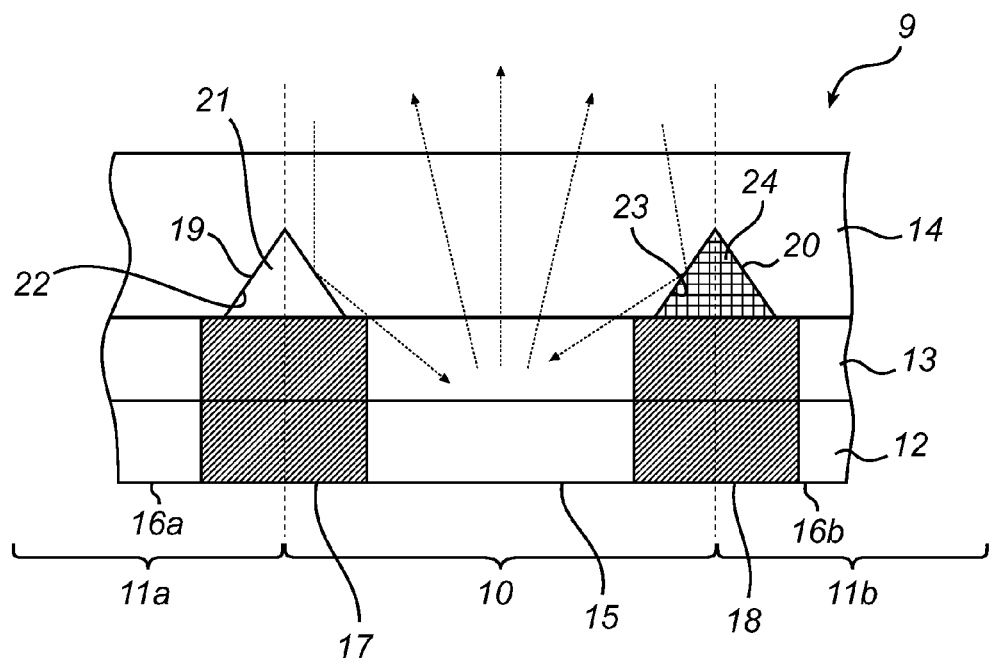
FIG. 2 is a schematic section view of a portion of a reflective display panel according to an embodiment of the present invention.

FIG. 2 is a schematic section view of a portion of a reflective display panel 9 according to an embodiment of the present invention.

In FIG. 2, one full pixel 10 is shown surrounded by portions of two adjacent pixels 11a-b. In the simplified and schematic illustration in FIG. 2, the display panel 9 is shown to comprise a lower substrate 12, a light-modulative layer 13 and a redirection sheet 14. Electrodes and other essential or optional components of the display panel 9 are not specifically indicated in FIG. 2 for the sake of clarity of drawing.

The display panel 9 has, as indicated by way of example in FIG. 1, modulative portions 15, 16a-b, which are controllable between light-modulation states, and non-modulative portions 17 and 18.

As indicated in FIG. 2, the redirection sheet 14 includes redirecting structures 19 and 20, and is arranged such that these redirecting structures 19 and 20 are aligned with corresponding non-modulative portions 17 and 18, respectively, of the display panel. Through the provision of these redirecting structures 19 and 20, in this case ridge-shaped indentations formed in the redirection sheet 14, light impinging on the redirecting structures 19 and 20 (which would otherwise have hit the non-modulative portions 17 and 18 and not contributed to the brightness and/or contrast of the display panel 9) is redirected towards the adjacent modulative portions 15, 16a-b, as indicated by the arrows in FIG. 2 for the central modulative portion 15.

Several redirecting structure configurations are possible for enabling efficient redirection of the incoming light. Various different configurations may involve different redirecting structure cross-sections, as discussed later in connection with FIGS. 4a-c, and/or different reflector configurations, two examples of which will now be described with continued reference to FIG. 2.

In FIG. 2, one of the shown redirecting structures 19 is an indentation which contains a material 21 (for example air or another fluid) having a lower refractive index than the redirection sheet. This redirecting structure 19 reflects by means of total internal reflection (TIR) at the interface 22 between the redirection sheet 14 and the contained material 21. The other redirecting structure 20 in FIG. 2 includes a specular reflector 23 which may be formed by a reflective layer, for example made by a metallic reflector material, such as aluminum (Al), silver (Ag) or an aluminum-neodymium (Al—Nd) alloy, covering the redirection sheet 14 at the indentation 20, or, alternatively, the indentation 20 may contain/be filled with a reflecting material 24 (as indicated in FIG. 2).

Figure 3A:
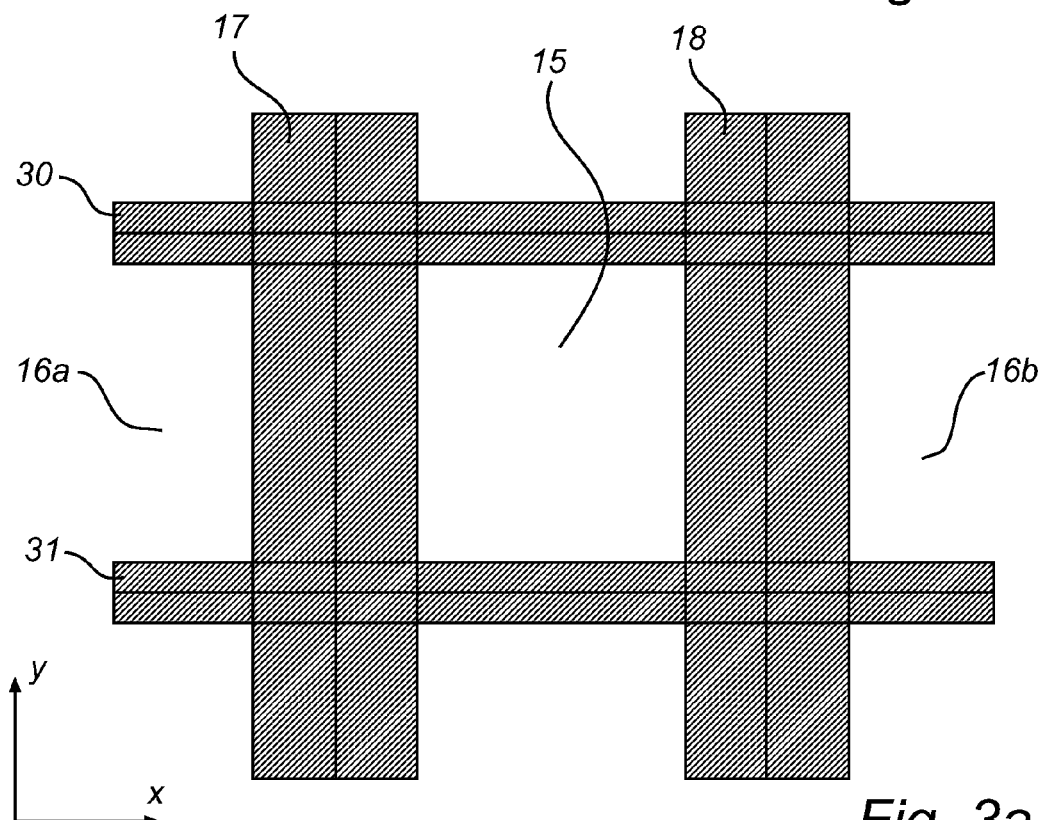
FIG. 3a schematically illustrates an exemplary reflective display panel having non-modulative portions extending in two directions.

FIG. 3a is a schematic plane view of a portion of the reflective display panel 9 in FIG. 2 shown without the redirection sheet 14.

As illustrated in FIG. 3a, the non-modulative portions 17 and 18 extending in the y-direction have larger extensions than the non-modulative portions 30 and 31 extending in the x-direction.

In order to achieve maximum redirection of incoming light from the non-modulative portions 17, 18, 30, and 31 towards the adjacent modulative portions 15 and 16a-b, the redirection sheet 14 should have redirecting structures with extensions essentially corresponding to the non-modulative portions 17, 18, 30, and 31 extending in both the x- and y-directions.

Figure 3B:
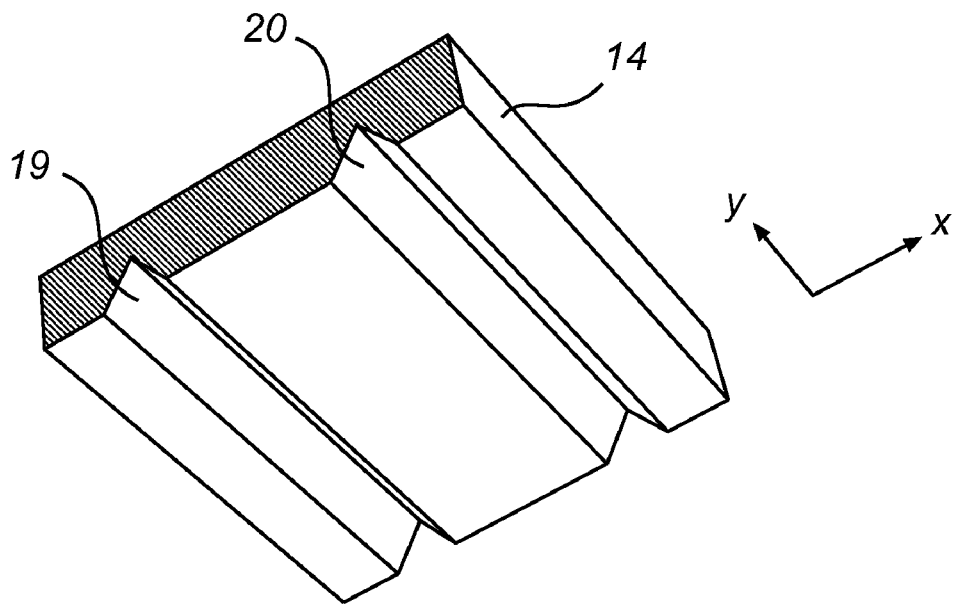

In order to achieve a favorable trade-off between improved image quality and manufacturability of the display panel 9, it may, however, be desirable to use a redirection sheet 14 having redirecting structures 19 and 20 extending in the y-direction only. This is schematically illustrated in FIG. 3b.

Figure 4A:
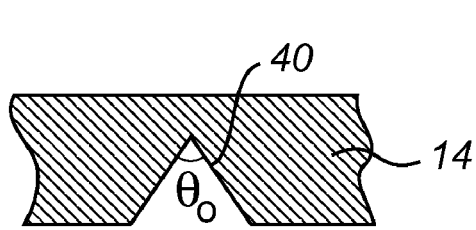
FIGS. 4a-c are schematic section views, illustrating three exemplary redirecting structure configurations.
Figure 4B:
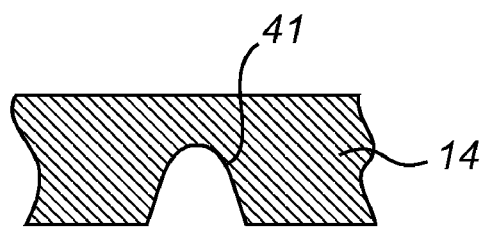
Figure 4C:
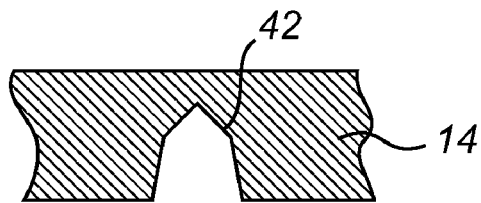

In FIGS. 4a-c, portions of three exemplary redirection sheets having different redirecting structure configurations are schematically illustrated.

The redirection sheet 14 in FIG. 4a has a redirecting structure 40 with an essentially V-shaped cross-section having an opening angle $\theta_o$ which may be between 10° and 150°, and preferably around 100°. The selection of suitable opening angle of this V-shaped cross-section will be discussed in more detail below in connection with FIG. 5.

FIGS. 4b-c schematically illustrate redirection sheets 14 having alternative redirecting structures 41 and 42, respectively, having cross-sections which are variations of the V-shaped cross-section in FIG. 4a. As would be obvious to the person skilled in the relevant art, numerous other variations are possible, and may be favorable depending on the particular application.

Figure 5:
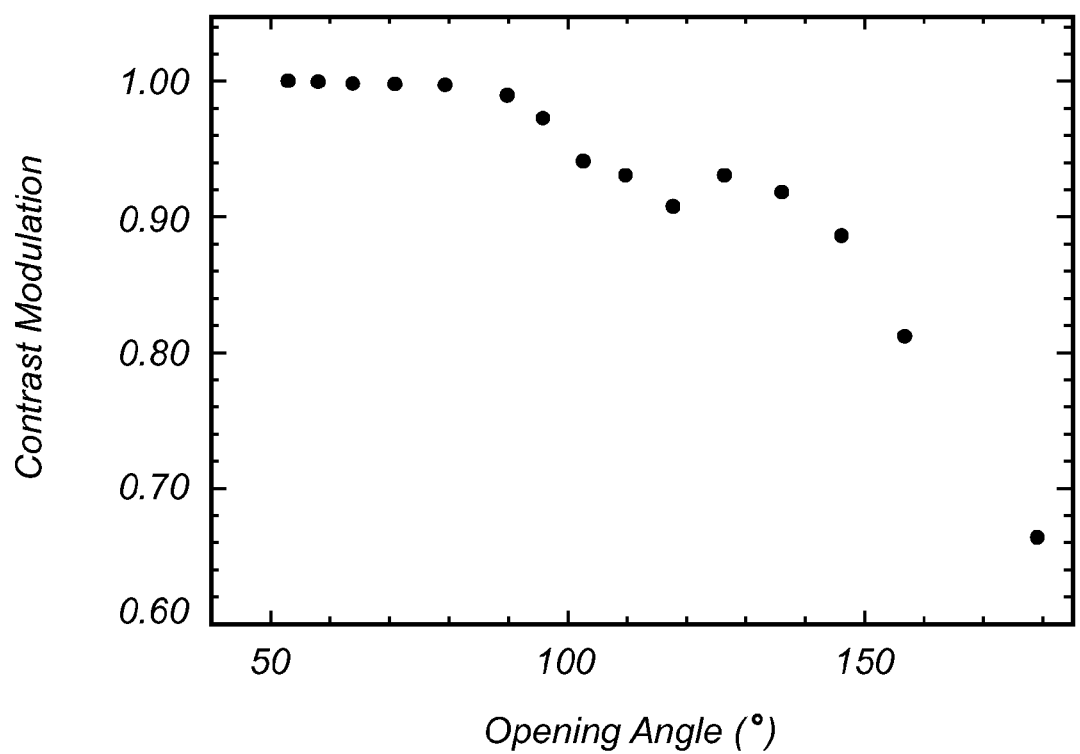

In FIG. 5, the contrast modulation of the reflective display panel in FIG. 2 as a function of opening angle $\theta_o$ (see FIG. 4a) is illustrated assuming that the redirecting structure behaves as a perfect reflector for all opening angles and angles of incidence of the incoming light. The contrast modulation M is given by the following relation:

$$M=(CR-1)/(CR+1)$$

Here, CR is the contrast ratio of the reflective display panel. For electronic reading and signage, the contrast modulation M should preferably be larger than 0.8, which, as can be seen in FIG. 5, is obtained for all opening angles below about 150°. As is also evident from FIG. 5, there are two "plateaus" in the curve for opening angles, one between 0° and approximately 80°, and another between approximately 100° and approximately 150° where the contrast modulation is practically independent of opening angle.

As will be described below in connection with FIG. 6, the redirection sheet may be stretched in the x-direction (see FIG. 3b) during manufacture of the display panel. Such stretching leads to an increase in opening angle $\theta_o$, which may lead to different opening angles in different portions of the display panel.

It is therefore advantageous to manufacture the redirection sheet such that it initially has an opening angle of around 100°, so that the opening angle can locally be increased due to stretching without having a spatially varying contrast modulation as a result thereof, provided the opening angle remains smaller than 150°.

Alternatively, it is advantageous to manufacture the redirection sheet such that it initially has a small opening angle (around 10°), so that the opening angle can locally be increased due to stretching without having a spatially varying contrast modulation as a result thereof, provided the opening angle remains smaller than 80°.

Figure 6:
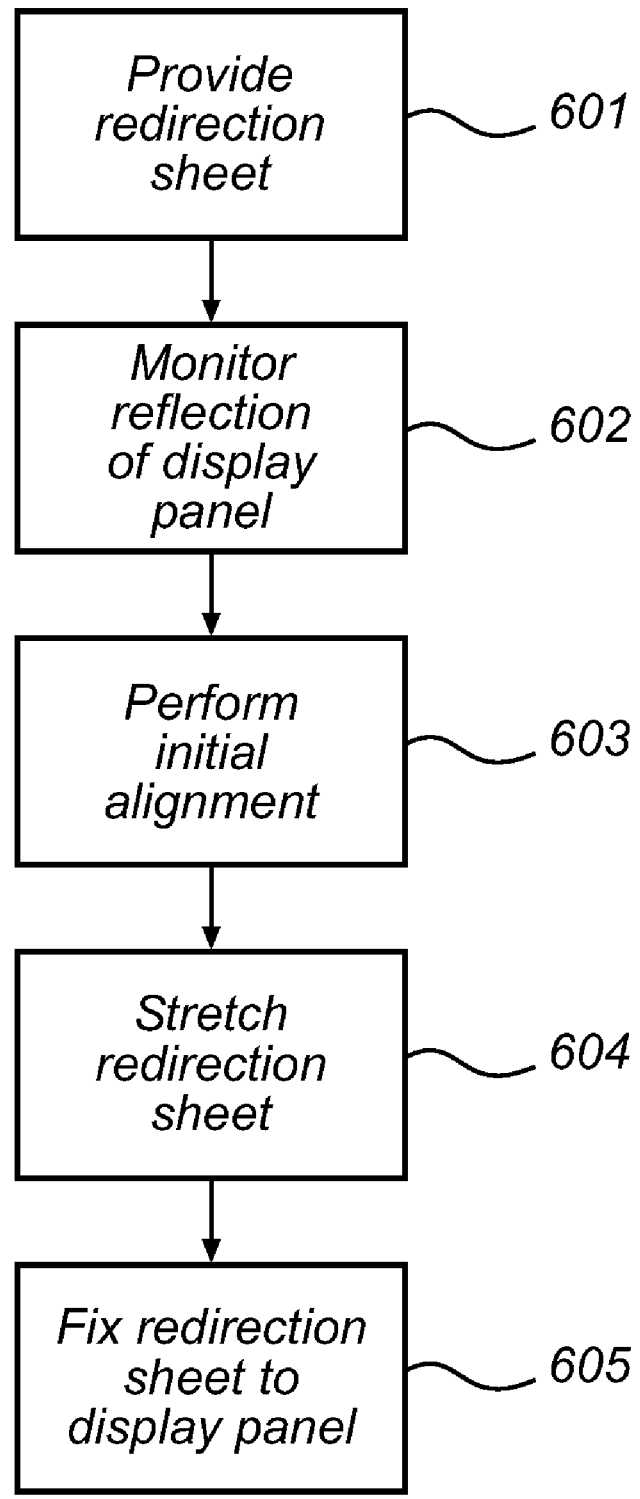
FIG. 6 is a flow chart illustrating a first exemplary manufacturing method according to the present invention.

Referring now to FIG. 6, which is a flow chart illustrating a first exemplary manufacturing method according to the present invention, a redirection sheet 14 having a plurality of redirecting structures 19 and 20 is provided in a first step 601. In a subsequent step 602, the reflection of the display panel 9, with the redirection sheet 14 positioned in front of the light-modifying layer 13 but not yet attached to the remainder of the display panel 9, is monitored. This monitoring of the reflection of the display panel 9 will be described further below in connection with FIGS. 7 and 8.

In the next step 603, an initial alignment is performed. In this step, the redirection sheet 14 is, guided by a result of the reflection monitoring, aligned such that either a sufficiently good or the best possible correspondence between the redirecting structures 19 and 20 and the non-modulative portions 17 and 18 is obtained. If the correspondence is judged to be sufficiently good, step 604 is bypassed, and the final step 605 of fixing the redirection sheet 14 to the remainder of the reflective display panel 9 is performed. This procedure is also followed for redirection sheet 14 materials which are not stretchable (for example, glass). If, on the other hand, the correspondence has reached a maximum (local or global) but is considered insufficient, the step 604 of stretching the redirection sheet 14 to compensate for differences in pitch between the non-modulative portions 17 and 18 and the redirecting structures 19 and 20 is performed. This stretching may take place for the entire display panel 9 at once, but is preferably performed successively, such that alignment is performed for a few redirecting structures at a time, whereafter an area of the redirection sheet 14 corresponding to these redirecting structures is fixed to the remainder of the display panel 9.

Figure 7:
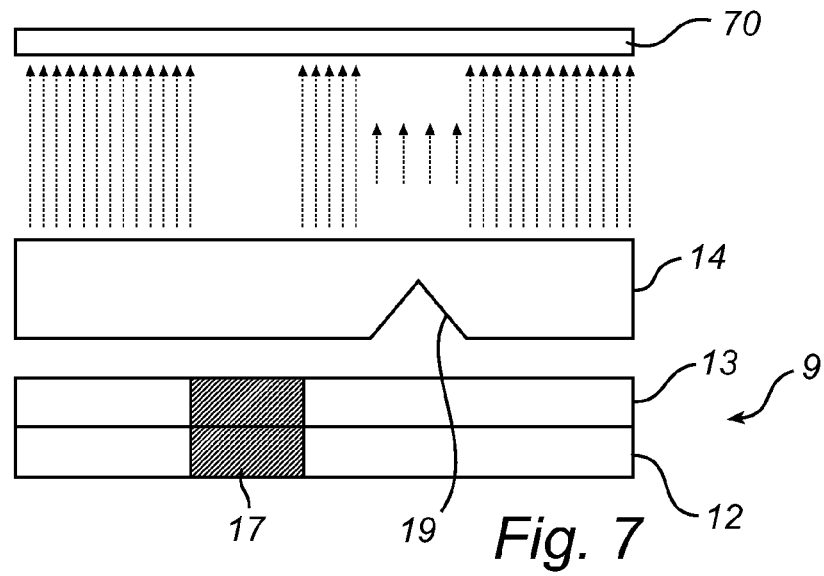
FIG. 7 schematically illustrates a set-up for monitoring of the reflection of the display panel during alignment.

In FIG. 7, a set-up for monitoring the reflection of a portion of the reflective display panel 9 during alignment and fixation of the redirection sheet 14 is schematically illustrated. As can be seen in FIG. 7, light from a light-source (not shown) incident on the display panel 9 is reflected back towards a detector 70. In the case shown in FIG. 7, the redirection sheet 14 is misaligned. Due to the misalignment a reflection pattern as is schematically indicated by the arrows in FIG. 7 is detected by the detector. In the present case, it is assumed that the non-modulative portions 17 and 18 are such that they do not reflect, that is, appear black to the detector 70. This is only an example, and a reflective display panel having non-modulative portions having another reflectance (which is constant) can be treated in a similar manner. Due to light-spreading in the redirection sheet 14 and reflections off the redirecting structure 19, the area above the redirecting structure 19 may not appear black, but as having a brightness between that of the modulative portions 15 and 16a-b and the adjacent non-modulative portions 17 and 18, practically regardless of the position of the redirecting structures in relation to the non-modulative portions.

Figures 8A, 8B:
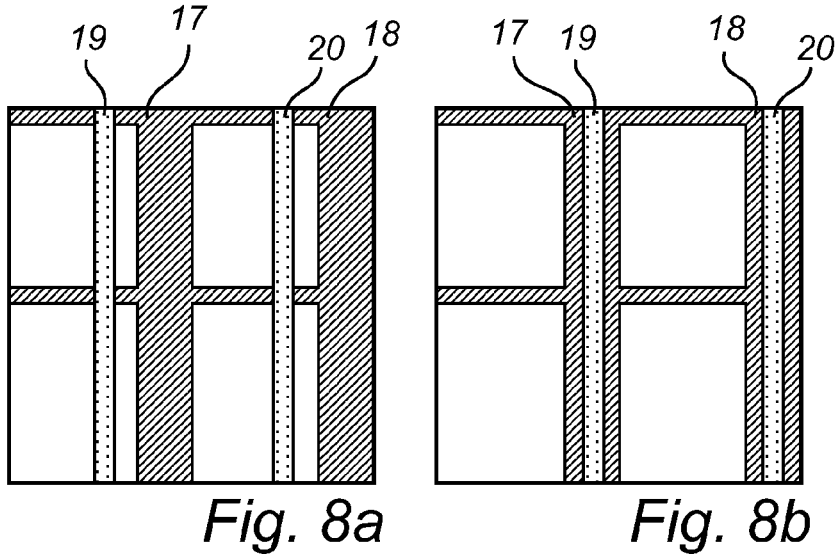
FIGS. 8a-c schematically illustrate exemplary responses of the set-up in FIG. 7 during alignment.
Figure 8C:
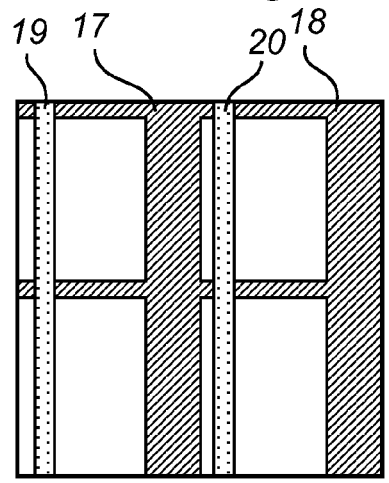

FIGS. 8a-c schematically show a respective response of the detector 70 for three different alignment states of the redirecting structures 19 and 20 with respect to the non-modulative portions 17 and 18.

In FIG. 8a, the redirection sheet 14 is positioned too far left, in FIG. 8b, the alignment of these two redirecting structures 19 and 20 is acceptable, and in FIG. 8c, the redirection sheet is positioned too far to the right.

In case the response indicated in FIG. 8b is obtained for the redirecting structures 19 and 20, the redirection sheet 14 may be locally fixed to the remainder of the display panel, and the procedure thereafter repeated for following redirecting structures.

For some display panels with all transparent substrates, the above-described procedure may readily be adapted to be performed in transmission, that is, the display panel is positioned between the light-source and the detector. The alignment principle is equivalent to that described above for the reflective alignment method.

Figure 9:
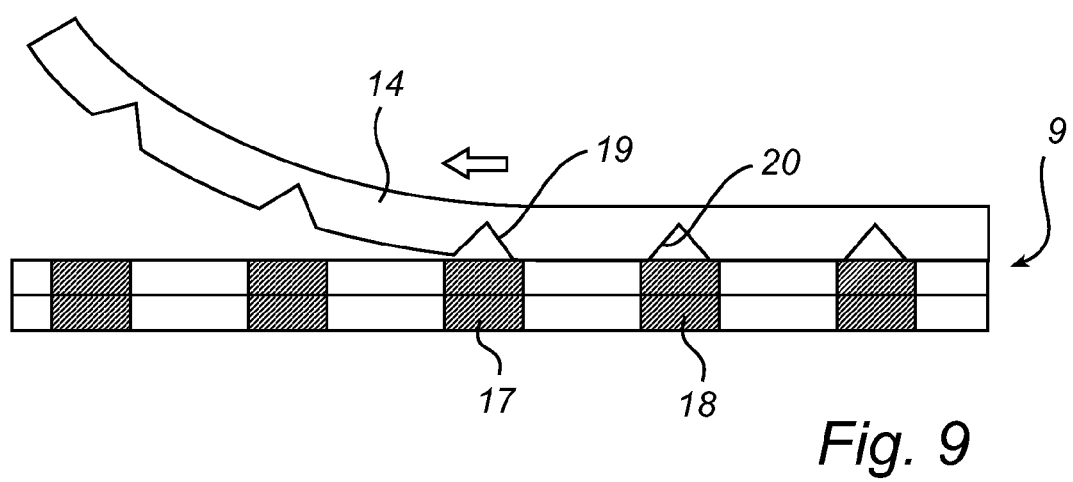
FIG. 9 schematically illustrates reel-to-reel manufacturing of the display panel in FIG. 2.

In FIG. 9, reel-to-reel manufacturing of the display panel 9 in FIG. 2 is schematically shown, where the redirection sheet is successively attached to the display panel 9 from the right to the left in the figure. The alignment of the redirecting structures 19 and 20 to the non-modulative portions 17 and 18 is continuously monitored and the tension applied to the redirection sheet 14 is controlled such that the redirection sheet 14 may, if necessary, be stretched to achieve alignment across the entire display panel 9.

Figure 10:
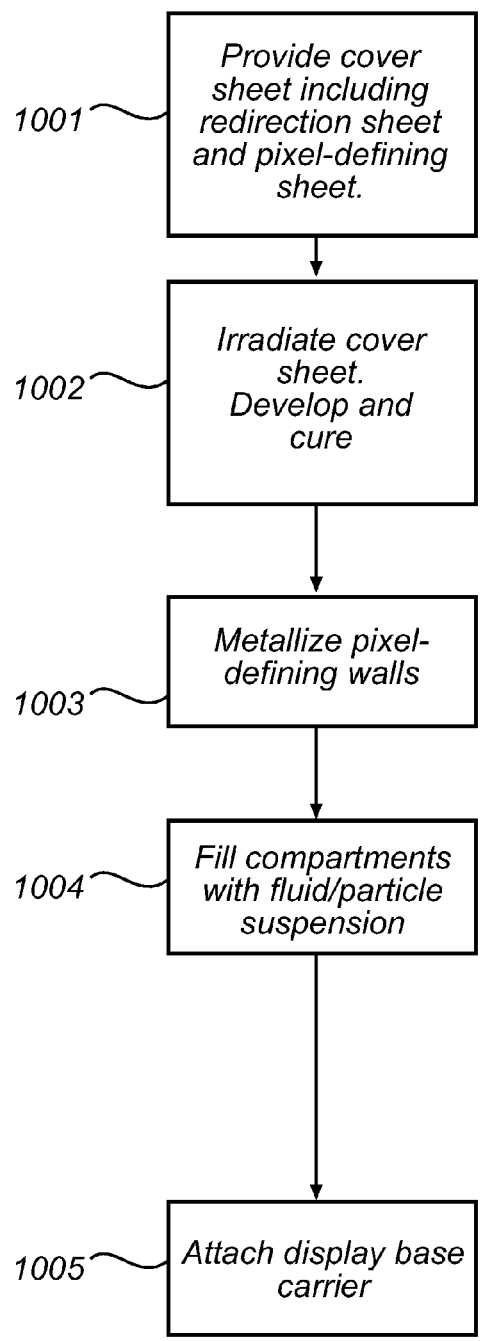
FIG. 10 is a flow chart schematically illustrating a second exemplary manufacturing method according to the present invention.

A second exemplary manufacturing method according to the present invention will now be described with reference to the flow-chart in FIG. 10 and the schematic illustrations of the reflective display panel manufactured according to this method in states following the corresponding method steps.

According to this second exemplary manufacturing method, a cover sheet 30 is provided in a first step 1001. The cover sheet 30 comprises a redirection sheet 14 having redirecting structures 19 and 20, and a pixel-defining sheet 31 including a light-transmissive base layer 32 and a photoimageable definition layer 33 formed by a positive photoresist.

The cover sheet 30 may, for example, be formed by laminating a thin light-transmissive film 32 on the redirecting structure side 34 of the redirection sheet 14. As previously mentioned, the redirecting structures 19 and 20 may include a reflector, or may be filled with a substance having a lower refractive index than that of the redirection sheet 14, such that a reflector reflecting through total internal reflection (TIR) is formed in the redirecting structures 19 and 20 at the interface between the redirection sheet 14 and the substance adjacent thereto.

Following this lamination, the thin film 32 may be coated with a photoimageable substance having suitable properties, such as a positive photoresist 33. The thickness d of this photoresist layer should be selected such that the height h (in FIG. 11b) of developed and cured structures formed from the photoresist 33 corresponds to the desired thickness of the light-modifying layer.

Figure 11:
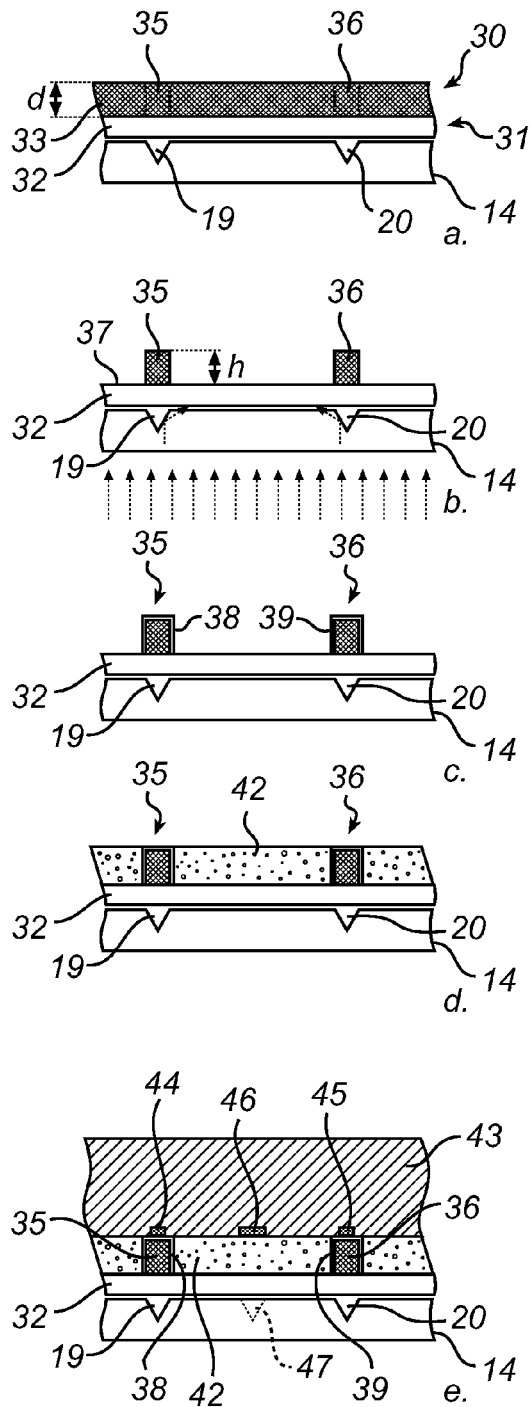
FIGS. 11a-e schematically illustrate the reflective display panel manufactured according to the method of FIG. 10 in states following the corresponding method steps.

In the next step 1002, the cover sheet is irradiated with light, as indicated by the arrows in FIG. 11b, having suitable characteristics for activating the photoresist 33. Due to the light-redirecting properties of the redirecting structures 19 and 20, very little light will expose the portions 35 and 36 of the photoresist layer 33 corresponding to the redirecting structures 19 and 20. On the contrary, the remainder of the photoresist layer 33, which is unshielded by the redirecting structures 19 and 20, will be exposed by the light. After having developed and cured the photoresist layer 33, only the pixel-defining wall structures 35 and 36 will remain. These wall-structures 35 and 36 will be perfectly (and automatically) aligned with the corresponding redirecting structures 19 and 20.

Since the wall-structures 35 and 36 will be included in the non-modulative portion of the finished pixel, the redirecting structures 19 and 20 are thus perfectly aligned to this part of the non-modulative portion of the pixel.

In some embodiments of reflective display panels, it may be advantageous if one of the electrodes between which the pixel controlling electric field is formed in operation of the display panel on the pixel defining walls 35 and 36. In order to accomplish this, the pixel-defining walls 35 and 36 may be made conductive, for example through metallization in the subsequent step 1003. This metallization may, for example, be carried out by metallizing the entire upper surface 37 of the cover sheet, applying a new photoresist layer (not shown) on top of the metal layer, exposing and developing this photoresist layer, and then etching away the unwanted portions of the metal layer, whereafter the remainder of this photoresist layer is removed. How to carry out this briefly described process is well-known to the person skilled in the art, who is typically also aware of other equally well-known alternatives ways of patterning a metal layer. Another option is to micro-stamp a conductive polymer at desired locations on the upper surface 37 of the uncovered base layer 32.

As a result of the processing carried out in step 1003, thin metal layers 38 and 39 has been formed on the corresponding wall structures 35 and 36 as illustrated in FIG. 11c.

In the subsequent step 1004, the compartments 41 defined by the wall structures 35 and 36 are filled with a light-modulative member 42. In the present example, the reflective display panel manufactured is an electrophoretic display. Therefore, the light-modulative member 42 is here provided in the form of a fluid/particle suspension. It is readily understood that the here illustrated fluid/particle suspension may be replaced by another light-modulative member, such as a liquid crystal material or a set of immiscible fluids. In the final step, 1005, a display base carrier 43 having an electrode pattern 44, 45, 46 is attached to the cover sheet 30, thereby closing the compartments defined by the wall structures 35 and 36. First pixel control electrodes 44 and 45 are hereby connected to the metallized wall structures 35 and 36 and a second pixel control electrode 46 is provided as a centrally located control electrode in the pixel compartment defined by the wall structures 35 and 36. Note that the structures 35 and 36 form a continuous enclosing wall, and thus all walls of all pixels form one common electrode. Consequently, this common electrode typically only needs to be connected in one or a few location across the entire display panel, and it should be understood that the electrodes 44 and 45 shown in FIG. 11e are for illustrative purposes only.

However, the second pixel control electrode 46 provided inside the pixel compartment should be addressable, for example by means of a TFT matrix.

In order to keep the alignment tolerances at a reasonable level while still achieving well-defined second electrodes in the pixels, the second electrodes 44 and 45 provided on the display base carrier 43 should preferably be considerably smaller than the corresponding wall structures 35 and 36 as also indicated in FIG. 11e.

In some applications, it may be sufficient for the redirecting structures 19 and 20 to redirect light away from the part of the non-modulative portion constituted by the wall structures 35 and 36 to the remainder of the pixel, while in other applications, it may be preferable to include a further redirecting structure 47 (indicated by the dotted line in the redirection sheet 14 in FIG. 11e) essentially corresponding to the first electrode 46 in the display base carrier 43. This further redirecting structure 47 may advantageously be formed as pyramidic indentation in the redirection sheet 14.

The person skilled in the art realizes that the present invention by no means is limited to the preferred embodiments. For example, the redirecting structures may not be indentations, but reflecting structures that have been inserted or pressed into the redirection sheet. Additionally, the redirecting structures may be combined with absorbing structures around or beneath them to improve the contrast—this is especially advantageous in case the redirecting structures rely on total internal reflection, because for some angles some light may enter the low index cavity. It may then be absorbed in the "traditional" black mask which is underneath the redirecting structure. Additionally, parts of the redirecting structure may be made to absorb the light—this is interesting in case of a non V-shaped cross-section, for example an U-shaped cross-section where the flatter part of the cross-section are made opaque. Furthermore, the pixels comprised in the reflective display panel may be hexagonal, honey-comb shaped, or triangular.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A reflective display panel (9), comprising
  a plurality of pixels, each pixel having a modulative portion controllable between light-modulation states, and a non-modulative portion, and
  a redirection sheet having a plurality of redirecting structures each being configured to redirect ambient light incident thereon towards an adjacent modulative portion.

2. The reflective display panel (9) according to claim 1, wherein the redirection sheet (14) comprises a first set of redirecting structures (19, 20) extending essentially parallel in a plane defined by the redirection sheet (14).

3. The reflective display panel (9) according to claim 2, wherein the redirection sheet (14) further comprises a second set of essentially parallel redirecting structures having a different direction of extension than the first set of redirecting structures (19, 20) in the plane defined by the redirection sheet (14).

4. The reflective display panel (9) according to claim 1, wherein each of the redirecting structures (19, 20) is provided as an indentation on a first face of the redirection sheet (14), and the redirection sheet (14) is arranged in such a way that the ambient light is incident on a second face thereof opposing the first face.

5. The reflective display panel (9) according to claim 4, wherein the indentation (19) contains a material (21) having a lower refractive index than the redirection sheet (14).

6. The reflective display panel (9) according to claim 4, wherein the indentation (20) contains a reflective material (24).

7. The reflective display panel (9) according to claim 4, wherein the indentation (19, 20) has an essentially V-shaped cross-section.

8. The reflective display panel (9) according to claim 7, wherein an opening angle ($\theta_o$) of the V-shaped cross-section is smaller than 150°.

9. The reflective display panel according to claim 1, further comprising a covering sheet arranged to cover the redirection sheet (14), the covering sheet having a refractive index which is substantially equal to that of the redirection sheet (14).

10. The reflective display panel according to claim 1, wherein each pixel comprises a liquid crystal layer and a pair of electrodes arranged in such a way that a modulative portion of the liquid crystal layer is controllable between light-modulation states through application of a voltage between the electrodes.

11. The reflective display panel according to claim 1, wherein each pixel comprises two immiscible fluids having different optical properties, and a pair or electrodes for controllably moving the fluids in relation to each other through application of a voltage between the electrodes.

12. The reflective display panel according to claim 1, wherein each pixel comprises a fluid and a plurality of charged particles suspended therein, and a pair or electrodes for controllably moving the plurality of charged particles through application of a voltage between the electrodes.

13. A method for manufacturing a reflective display panel (9), the method comprising the steps of:
  providing (601) a reflective display panel comprising a plurality of pixels (10, 11a-b), each having a modulative portion (15, 16a-b) which is controllable between light-modulation states, and a non-modulative portion (17, 18), and
  attaching, to the reflective display panel, a redirection sheet (14) having a plurality of redirecting structures (19, 20) configured to redirect ambient light incident thereon towards intermediate portions of the redirection sheet (14), in such a way that each of the redirecting structures (19, 20) is essentially aligned with a corresponding one of the non-modulative portions (17, 18).

14. The method according to claim 13, wherein the step of attaching comprises the steps of:
  aligning the redirecting structures (19, 20) with corresponding non-modulative portions (17, 18) in the display panel, and
  fixing (605) the redirection sheet (14) to the display panel.

15. The method according to claim 14, wherein the step of aligning comprises the steps of:
  monitoring (602) a reflection of the display panel, and
  stretching (604) the redirection sheet (14) such that the evaluation indicates a correct alignment.

16. The method according to claim 13, wherein the redirection sheet (14) is applied in a reel-to-reel process.

17. A method for manufacturing a reflective display panel, comprising the steps of:
  providing (1001) a cover sheet (30) comprising a photoimageable pixel-defining layer (31), and a redirection layer (14) having a plurality of redirecting structures (19, 20) configured to redirect light incident thereon towards intermediate portions of the pixel-defining layer (31), and
  irradiating (1002) the cover sheet (30) from a redirection layer (14) side thereof by means of a light-source adapted to enable patterning of the photoimageable pixel-defining layer (31), thereby leaving portions (35, 36) of the pixel-defining layer corresponding to the redirecting structures (19, 20) essentially unexposed, while exposing remaining portions thereof,
  developing the pixel-defining layer (31), thereby forming a pixel-defining wall structure (35, 36) comprising a plurality of walled-in pixel areas,
  providing (1004) a light-modulative member (42) within each of the walled-in pixel areas, and
  providing (1005), on a pixel-defining layer (31) side of the cover sheet (30), a display base carrier (43).

18. The method according to claim 17, wherein the pixel-defining layer (31) comprises a positive photoresist (33).

19. The method according to claim 17, wherein the display base carrier (43) comprises an electrode pattern (44, 45, 46), and the step of providing (1005) the display base carrier comprises the steps of:
  aligning the display base carrier (43) to the cover sheet (30) in such a way that an electrode pair (38, 39, 46) is provided for each of the pixels, and
  attaching the display base carrier (43) to the cover sheet (30).

20. The method according to claim 17 further comprising the step of forming (1003), for each pixel, a conductive layer (38, 39) on at least a portion of the pixel-defining wall structure (35, 36).

* * * * *